(No Model.) 2 Sheets—Sheet 1.

J. A. CROCKER.
FILTER.

No. 279,226. Patented June 12, 1883.

WITNESSES
H. W. Stearns.
R. Moore

INVENTOR
James A. Crocker,
per Norman W. Stearns,
Attorney (No Model.) 2 Sheets—Sheet 2.

J. A. CROCKER.
FILTER.

No. 279,226. Patented June 12, 1883.

WITNESSES
H. W. Stearns
A. Moore

INVENTOR
James A. Crocker,
per Norman W. Stearns,
Attorney

UNITED STATES PATENT OFFICE.

JAMES A. CROCKER, OF BOSTON, MASSACHUSETTS, ASSIGNOR TO HERBERT N. SMITH, OF SAME PLACE.

FILTER.

SPECIFICATION forming part of Letters Patent No. 279,226, dated June 12, 1883.

Application filed October 26, 1882. (No model.)

*To all whom it may concern:*

Be it known that I, JAMES ALLEN CROCKER, a citizen of the United States, residing at Boston, in the county of Suffolk and State of Massachusetts, have invented certain Improvements in Filters, of which the following is a full, clear, and exact description, reference being had to the accompanying drawings, making part of this specification, in which—

Figure 1:
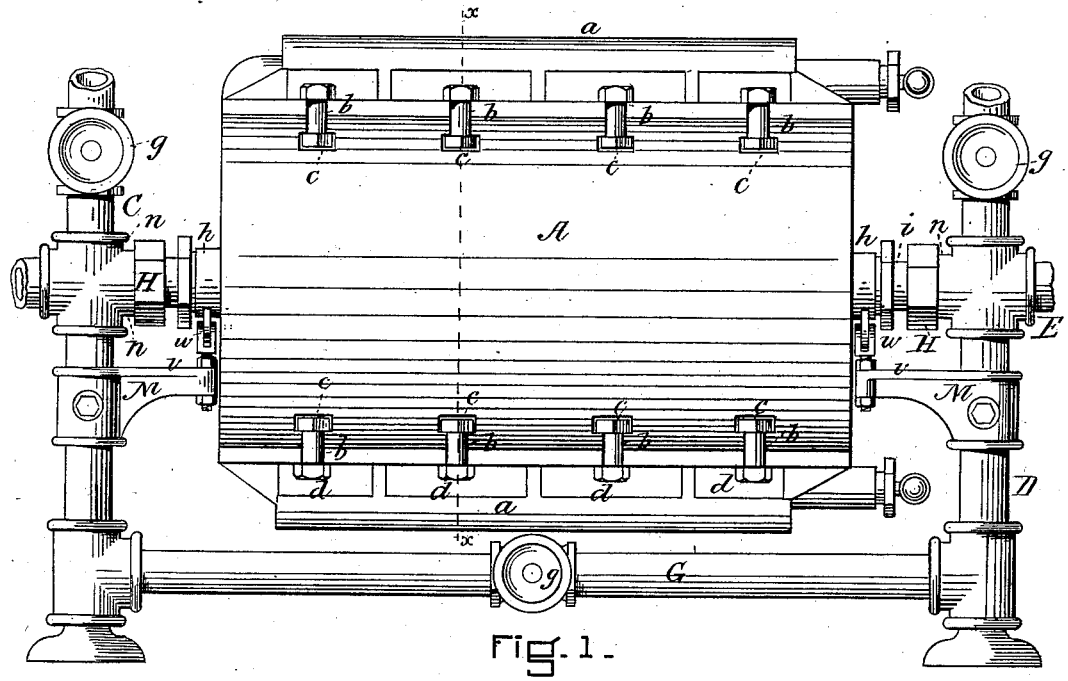
Figure 2:
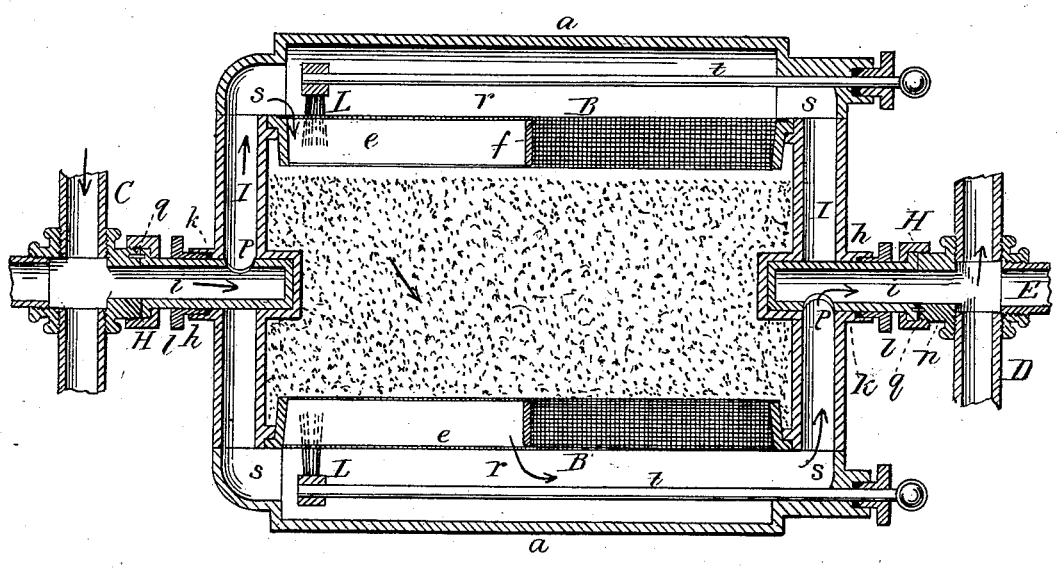
Figures 3, 6, 7:
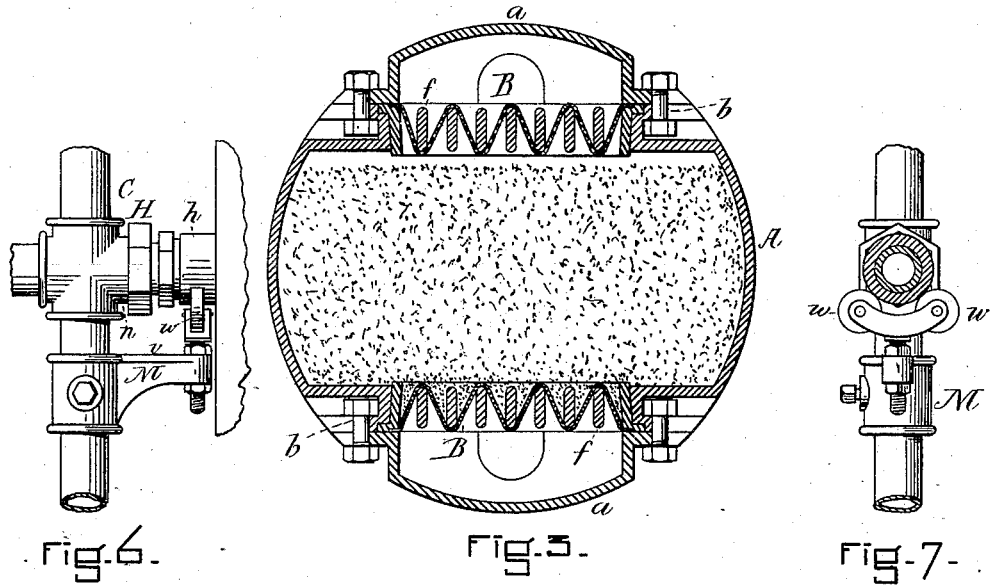
Figures 4, 5:
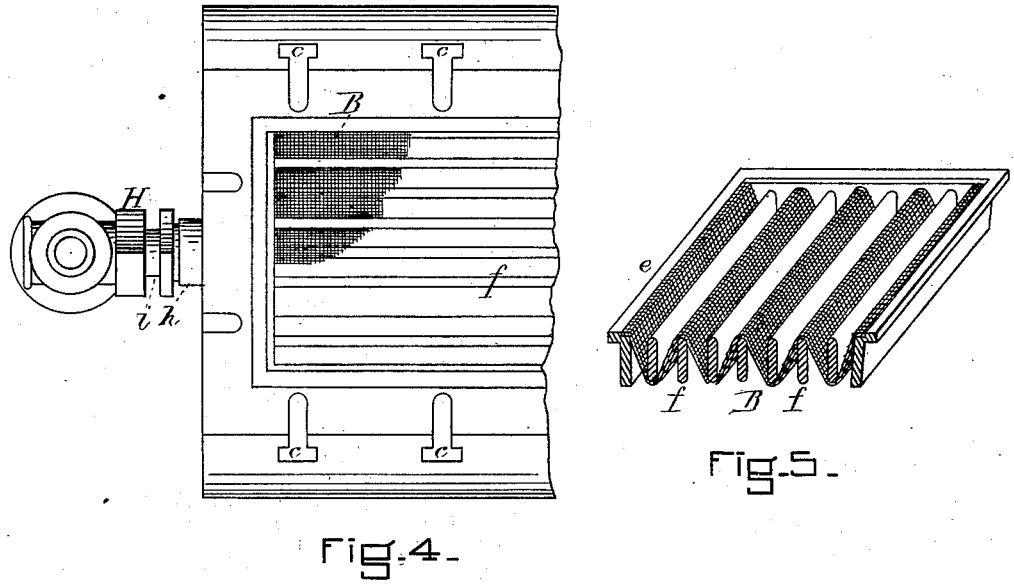

Figure 1 is a front elevation of a filter constructed in accordance with my invention. Fig. 2 is a longitudinal vertical section through the center of the same. Fig. 3 is a transverse vertical section on the line $xx$ of Fig. 1. Fig. 4 is a plan of the top of the casing with a portion of the cover broken away. Fig. 5 represents my improved strainer; Figs. 6 and 7, sectional details to be referred to.

My present invention has for its especial object to simplify the construction and thereby reduce the cost of a filter, without detracting from its efficiency; and this invention consists in a single independent shell or casing having no outer or inclosing casing, said single casing containing the filtering material and passages for the flow of the water, in combination and communicating with hollow stationary journals, which serve as inlet and outlet pipes, and around which the single filter-casing is capable of being reversed, whereby the filter is simplified and the cost of the ordinary outer or inclosing shell or casing is avoided.

My invention also consists in a stand or frame formed of the supply and distributing pipes for supporting the filter, and in which its journals are prevented from rotating, the filter revolving around stationary journals.

My invention also consists in a pair of corrugated strainers located outside the filtering material and fitting into frames provided with supporting-bars, said frames being held in place at the opposite sides of the filter by covers, whereby the superficial area of the straining-surface is increased, which is desirable or necessary when water under a low pressure is to pass through the filter, and the removal of the strainers readily permitted; and my invention also consists in a pair of brushes or scrapers, each located within the casing between one of its covers and its contiguous strainer, and provided with a handle accessible from the outside of the filter, in order that the brush may be operated either when the water is flowing through or shut off from the same; and my invention also consists in auxiliary supports for the hub of the filter-casing to be used when the latter is of considerable size and weight.

To enable others skilled in the art to understand and use my invention, I will proceed to describe the manner in which I have carried it out.

In the said drawings, A represents a metallic casing, provided with covers $a$ at its upper and lower sides, said covers being held in place by a series of bolts, $b$, projecting out on each side of the outer edges of the casing, the heads of the bolts being slid into shouldered recesses $c$, formed therein, in which position their tightening-nuts $d$ may be readily loosened when the covers are to be removed. Extending around the inner edges of the upper and lower sides of the casing are formed rectangular depressions, into which fit frames $e$, each having secured thereto a perforated wire-gauze strainer, B, preferably of corrugated form in cross-section, (see Figs. 3 and 5,) the outer surface of each frame lying flush with the outer surface of the casing, the strainer receiving additional support by resting on longitudinal bars $f$, extending between the ends of the casing, and the covers $a$, fitting snugly against the frames $e$ to prevent their movement outwardly. The interior of the casing contains the filtering material.

C is the vertical branch of the supply or service pipe entering the building from the street, and D is the vertical branch of the distributing-pipe passing up to the various apartments.

E is a horizontal pipe through which the sediment passes when the filter is reversed.

G is a horizontal pipe connecting the bottoms of the supply and distributing pipes, and is for the passage of the water (without flowing through the filter) when it is desired to obtain a large supply of water speedily—as, for instance, in the event of fire, or in case the filter is removed for repairs, &c. The various pipes are provided with valves $g$, by which they are opened or closed to direct the water as desired. Each end of the casing is provided with a hollow hub, $h$, for the reception of a hollow journal, i, which is surrounded by a suitable packing, k, held in place by a screw-thimble, l. The outer end of each hollow journal has slipped thereover a union coupling-nut, H, the outer end of which screws over a thread cut on a projection, n, extending out from its contiguous vertical pipe C or D, Figs. 1 and 2, by which construction the parts are made perfectly water-tight, and the casing is free to be revolved on its journals. Each journal is provided with a circular opening, p, lying in a horizontal plane, and extending from its interior to its outside in line with a vertical passage or pipe, I, formed within each end of the casing, and extending in a diametrical direction between and terminating on a level with the planes of the outsides of the strainers, the passage through each journal being of the same diameter as that of its vertical communicating pipe, C or D, in which it has its bearings. Each journal is prevented from turning within its hub by means of a dowel-pin, q, projecting out from the pipe-bearing, and entering the outer flanged end of the journal, whereby the latter is prevented from revolving, and the position of its circular opening p is kept unchanged. The circular opening p of the inlet-passage of the journal connected with the supply-pipe C is located at its top, while that of the outlet-passage of the other journal having its bearing in the distributing-pipe D is at its bottom, their positions alternating only when the casing is reversed, the said arrangement of the openings p in the journals allowing the water when turned on to pass freely in the direction of the arrows, Fig. 2, through the hollow journal i, through the upper branch of its contiguous casing-pipe I into the space r between the upper corrugated strainer and its cover, thence down through said strainer into the filtering material, the greater or heavier portion of the sediment contained in the water being deposited on the outer surface of the upper strainer, while all or nearly all of the small remainder is taken up or absorbed by the filtering material, the water flowing next through the lower strainer down into the space r between it and the lower cover, from whence it is forced up through the lower branch of the opposite pipe I within the casing and the circular opening p in the opposite journal, out in a horizontal direction through said journal into the upper branch of the distributing-pipe D, to be carried in various directions through auxiliary pipes connected therewith, to the apartments of the building. The inner side of each end of each cover a is hollowed out or recessed at a point, s, immediately opposite and in line with the passage through the pipe I, formed within the contiguous end of the casing, in order to afford an uninterrupted passage for the water to and from said pipe.

When the sediment collected on the upper surface of the upper strainer is to be removed, it is simply necessary to reverse the filter by turning it a half-revolution, close the valve in the distributing-pipe D, open the valve in the horizontal waste-pipe F, and the water from the supply-pipe C will carry off the sediment as desired.

To assist the water in cleansing the strainer from sediment and slime, which might otherwise adhere thereto, I locate in the space r, outside each strainer, a brush or scraper, L, of any suitable material, which comes into contact with the corrugated sides of the strainer, the brush or scraper being drawn longitudinally upon its outer surface by means of a handle, t, which passes through a stuffing-box, u, in the end of the cover. These brushes may either be rectangular, as shown, or circular in cross-section, and when circular be made to rotate over and upon the corrugated strainer by means of a ring connected with its handle, or by any other suitable device. In the event of the pressure of the water being insufficient to carry off the sediment deposited on the strainer, I intend to employ the pressure of steam, in which case the pipe conducting it may enter the supply-pipe C in a line with the hollow journal i and pass through and out of the casing in the same direction previously traversed by the water; and when steam is used the passage of the water in the supply-pipe must be closed by its valve g.

To relieve the journals of the weight of a heavy filter I intend to secure a bifurcated bracket, M, to each of the lower sections of the vertical pipes C D, forming the upright frame in which the journals bear, and provide each bifurcation v with a friction-roll, w, which will form a partial bearing for the hub, and on which the casing may be revolved. (See Figs. 1, 6, and 7.)

Where very large filters are required for manufacturing purposes—for instance, for boilers and other uses in paper, woolen, starch, iron, and other mills, where the weight is very considerable—and the water-pipes C D are not of sufficient strength to support the filter, I propose to locate it on one or more pair of friction-rolls, and thus render it capable of being readily reversed. This feature, however, I intend to claim in a future application for patent.

Instead of employing hollow journals for conducting the water through the filter, the journals may be solid and the pipes be made to enter the top and bottom of the filter, said pipes being connected by swivel tapering-joints with the supply and distributing pipes, and said connecting-pipes may be either rigid or flexible; but as this means of connecting the casing with the supply and distributing pipes will also form subject-matter in another application for patent, I will not here enter into the details by which it is carried out.

Instead of conducting the water from the upper branch of the supply-pipe C through the contiguous hollow journal i, and up the upper branch of the contiguous pipe I in the casing, and thence down through the upper strainer, the annular opening $p$ in said hollow journal $i$ may be turned downward, so as to communicate with the lower branch of the vertical supply-pipe C, and the water pass down into the space $r$ between the lower strainer and the lower cover, the lighter portions of the sediment being carried up and laid upon the under side of said strainer, while the heavier portion would be deposited on the lower cover, and on the reversal of the casing would also fall on the upper side of said strainer, from which it may be removed, assisted by the brush or scraper L down the upper branch of the opposite pipe I, (in the casing,) from which it would be discharged into the horizontal waste or sediment pipe F, and therefore I may employ the filter in either manner described.

In the foregoing I have referred to hollow journals provided with circular openings $p$, to enable them to open communication with the supply and distributing pipes, the inner end of each journal being closed. I may, however, employ at each end of the casing a hollow journal without such opening $p$ and with its inner end open, one such journal communicating with the supply-pipe C, and the other with the distributing-pipe D, in which case I intend to use a solid cylindrical plug to serve as a valve in the inlet-pipe I of the casing, which plug will, on the reversal of the casing, descend by its gravity into and close the lower branch of said inlet casing-pipe, while within the outlet-pipe I of the opposite end of the casing I locate a vertical cylindrical valve of a length exceeding that of the said outlet casing-pipe, and provided with flanges at its ends to fit over and close the ends of said pipe alternately, the lower end of said valve projecting down beyond the bottom of the said pipe to allow of the passage upward therein of the water after it flows into the space between the lower strainer and its cover.

I claim—

1. A filter having only a single independent shell or casing, A, in which are directly located the filtering material and passages I I for the flow of the water through the filter, in combination with the hollow stationary journals $i\ i$, around which said casing is capable of being turned, and which also serve as inlet and outlet pipes communicating with the passages I I, constructed to operate substantially as described.

2. In combination with the frame composed of the supply and distributing pipes C D, the filter having hollow journals $i\ i$, supported by said frame, said journals also serving as inlet and outlet pipes, as and for the purpose described.

3. The filtering-casing A and its covers $a$, in combination with a pair of corrugated strainers B and their frames $e$, provided with supporting-bars $f$, the said strainers being located at the opposite sides of the casing, substantially as set forth.

4. In combination with the filtering-casing A, covers $a$, and corrugated strainers B, the brushes or scrapers L, located between said covers and strainers and provided with handles projecting outside of the casing, whereby they may be manipulated at pleasure, substantially as explained.

5. A filter consisting of only a single casing, A, with its vertical pipes I I, located at opposite sides thereof, the hollow journals $i\ i$, with their openings $p\ p$, and the supporting-frame composed of branches of the supply and distributing pipes C D, combined and communicating with each other in the manner and for the purpose set forth.

6. The auxiliary supports or brackets M, with their friction-rolls $w$, for relieving the journals of the greater portion of the weight and wear of the filter, in combination with the vertical branches of the supply and distributing pipes C D, upon which the brackets are capable of being adjusted, as and for the purpose described.

Witness my hand this 17th day of October, 1882.

JAMES A. CROCKER.

In presence of—
JAS. W. CHAPMAN,
N. W. STEARNS.